(12) United States Patent
Cerruti

(10) Patent No.: US 6,347,814 B1
(45) Date of Patent: Feb. 19, 2002

(54) INTEGRAL JOINT FOR THE CONNECTION OF TWO PIPES

(75) Inventor: Sergio Cerruti, *deceased*, late of Milan (IT), by Flavia Cerqua, heiress

(73) Assignee: ENI S.p.A., Rome (IT)

(*) Notice: Subject to any disclaimer, the term of this patent is extended or adjusted under 35 U.S.C. 154(b) by 0 days.

(21) Appl. No.: 09/505,684

(22) Filed: Feb. 17, 2000

(30) Foreign Application Priority Data

Feb. 19, 1999 (IT) .......................................... MI99A0336

(51) Int. Cl.⁷ ............................. F16L 25/00; F16L 35/00
(52) U.S. Cl. .................... 285/334; 285/333; 285/332.4; 285/355
(58) Field of Search ............................ 285/334, 333, 285/332.4, 355

(56) References Cited

U.S. PATENT DOCUMENTS

| | | | | |
|---|---|---|---|---|
| 4,610,467 A | * | 9/1986 | Reimert | 285/24 |
| 5,066,052 A | * | 11/1991 | Read | 285/334 |
| 5,505,502 A | * | 4/1996 | Smith et al. | 285/334 |
| 5,687,999 A | * | 11/1997 | Lancry et al. | 285/333 |
| 5,971,443 A | * | 10/1999 | Noel et al. | 285/94 |

FOREIGN PATENT DOCUMENTS

| | | |
|---|---|---|
| EP | 0 108 980 | 5/1984 |
| EP | 0767 335 | 4/1997 |
| EP | 0 803 637 | 10/1997 |

* cited by examiner

*Primary Examiner*—B. Dayoan
*Assistant Examiner*—Carlos Lugo
(74) *Attorney, Agent, or Firm*—Oblon, Spivak, McClelland, Maier & Neustadt, P.C.

(57) ABSTRACT

Integral joint of two pipes which comprises a first box element, equipped with an internal two-step thread, situated on the end of a first pipe, a second pin element, equipped with an external two-step thread, situated on the end of a second pipe, two metal-to-metal seals located at both ends and with at least two shoulders arranged at one end and at the centre of the joint respectively.

2 Claims, 4 Drawing Sheets

INTEGRAL JOINT FOR THE CONNECTION OF TWO PIPES

The present invention relates to an integral joint of two pipes.

More specifically, the present invention relates to an integral joint system for pipes to be used as a well casing.

The term "casing", as used in the present description and claims, refers to a tubular structure, consisting of various portions of pipe assembled together by means of a mechanical joint, set inside a well for the production of hydrocarbons as reinforcement and support of the walls of the well itself.

As it is known, the petroleum industry has the tendency of reducing the diameters of production wells to obtain a reduction in the drilling costs. To achieve this result, however, the connections which join the portions of pipe to obtain the casing, must have a geometry which is substantially identical to that of the pipes themselves, i.e. substantially having the same external and internal diameter.

Integral connections or joints, such as flush joints and near-flush joints, have been proposed for the purpose, which have an external diameter equal to that of the pipes to be assembled (flush joint) or a slightly higher diameter (2–3.5%) (near-flush joint).

The disadvantage of these joints, however, is the supplying of connections with mechanical properties, such as tensile, compression, torque and bending strengths which are much lower than those of the pipes themselves. In particular, the tensile strength of flush joints or near-flush joints vary from 65% to 75%, with respect to the pipe body, depending on the diameter and thickness of the pipe. The compression, bending and torque strengths, which are often a fraction of those of the pipe, are even more reduced.

These reductions in the mechanical characteristics limit the applications of these connections to wells with a limited depth, with low differential pressures and which do not require rotation while inserting the pipe inside the drilling holes (as required for example in the case of liner cementation).

Integral, near-flush joints of the type mentioned above, containing modifications suitable for improving the mechanical characteristics, have been proposed in literature with the aim of overcoming these drawbacks. For example, the published international patent application WO 93/18329 describes an integral joint, machined on each end of the pipes to be assembled, made up of two elements, pin and box. Each element contains at least two threaded sections each separated by a joining shoulder suitable for mating into each other when the pipes are assembled.

The published European patent application 767,335 describes an integral joint for pipes, machined on each end of the pipes to be assembled and made up of two threaded elements, pin and box, having a tapered-conical longitudinal section. The two threads are interrupted, in an intermediate position, by a shoulder orthogonal to the axis of the pipes.

To improve the sealing effect of the joint, the initial parts of the threads of the pin element and the end parts of the threads of the box element have been removed, by mechanical processing, so that, when joined, the two surfaces come into contact with a consequent elastic deformation of the surfaces involved.

The connections described above, although having improved mechanical performances with respect to a flush type joint, are still not sufficient to guarantee suitability for deep wells.

The Applicant has now found an integral joint, of the near-flush type, characterized by a significant improvement in the compression and torque strengths. This improvement is obtained by means of a particular design of the ends of the pin and box elements of the joint, as described hereunder, which allows the machining of at least two shoulders (external and intermediate), in order to increase the compression strength to a value close to the tensile strength and also the torque strength, whose maximum value is equal to about 2.5 times the make-up torque of the joint.

In addition, the presence of two metal seals (internal and external), together with the shoulders and particular two-step thread profile, allows the connection to have an excellent resistance to combined load, making it possible to tolerate extreme pressure, tensile, compression, bending and torque stresses in the well, making the connection itself very appropriate for deviated or horizontal, high pressure and high temperature wells.

The object of the present invention therefore relates to an integral joint for the connection of two pipes comprising:
a) a first box element with a tapered-conical longitudinal section, equipped with an internal two-step thread machined at an end of a first pipe;
b) a second pin element, equipped with an external two-step thread machined at an end of a second pipe, having a tapered-conical longitudinal section, suitable for making-up inside the box element;
c) a shoulder, orthogonal to the axis of the pipe, positioned on the pin element, half-way along the thread;
d) a shoulder, orthogonal to the axis of the pipe, positioned half-way along the thread of the box element and suitable for mating with the shoulder of the pin element when the connection is made-up;
e) two insets machined at the beginning and at the end of the box element respectively, suitable for interfering with corresponding flares machined at the beginning and at the end of the pin element; characterized in that:
f) between the flare and beginning of the thread of the pin element there is an annular slot, the depth of which (allowing the thread to be machined) is recovered with a corresponding shoulder, having a thickness substantially equal to the depth of said slot, at the end of the thread;
g) between the initial inset of the box element and beginning of the corresponding thread, there is another annular slot, similar to the first, the depth of which (allowing the thread to be machined) is recovered with a possible corresponding shoulder or is absorbed in the inset at the end of the thread.

According to the present invention, it is therefore possible to obtain an integral joint, with at least two shoulders, having a slight increase in the external diameter (2–3%) in correspondence with the joint itself, whose geometry consequently remains identical to that of the pipes to be connected. In fact, due to the presence of the two slots, which can have a length ranging from 1 to 2 cm and a depth of 2–4 mm, depending on the diameter and thickness of the pipe, the threads start from the portion of the pipe with the lower thickness so that, at the end of the thread, the thickness of the slot itself is recovered by the shoulders. In this way, at least one extra shoulder can be obtained at the end of the joint, without having to increase the thickness of the terminal portions of the pipes to be connected.

The integral joint of two pipes object of the present invention can be more easily understood by referring to the drawings of the enclosed figures which represent an illustrative but non-limiting embodiment and wherein.

Figure 4:
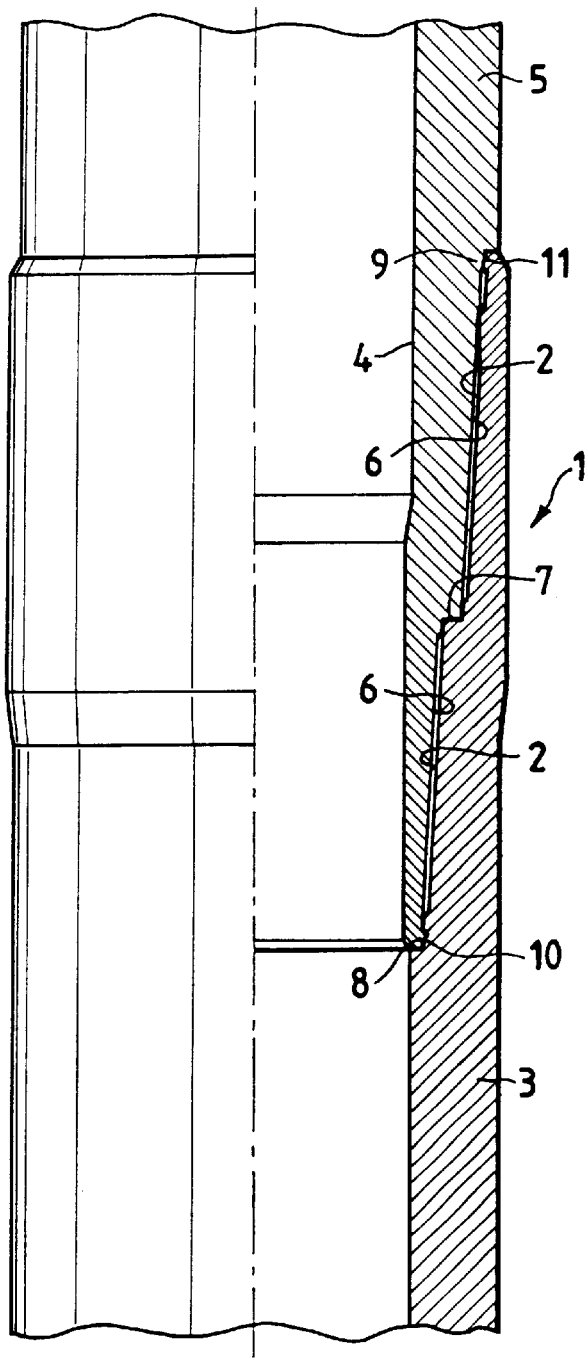
Figure 7:
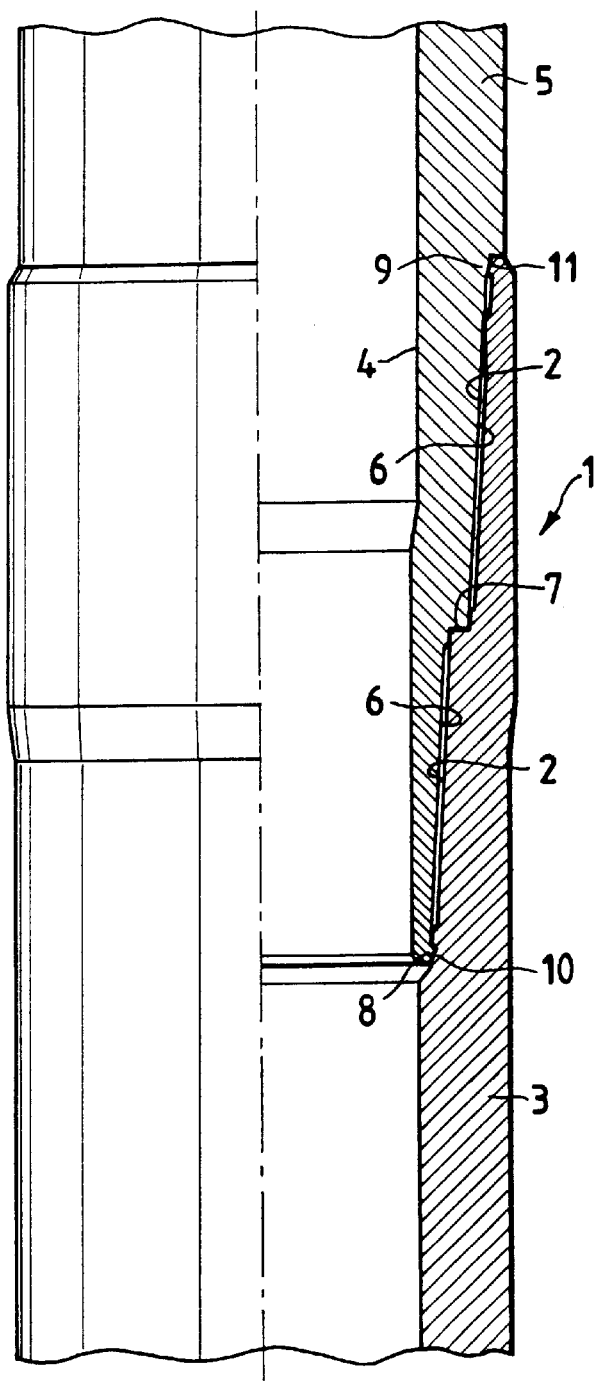
Figure 7A:
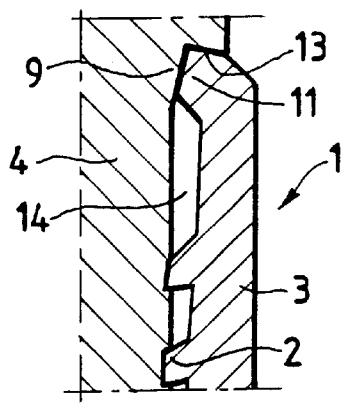

FIGS. 4 and 7 represent a complete section of the joint with the coupled pin and box elements. In particular, the drawings represent the longitudinal section of the joint with three details, 4A, 4B, 4C and 7A, 7B, 7C of the shoulders/metal seal. FIG. 4 refers to the joint with three shoulders design (one external, one intermediate and one internal); FIG. 7 refers to the joint with only two shoulders (one external and one intermediate).

Figure 3:
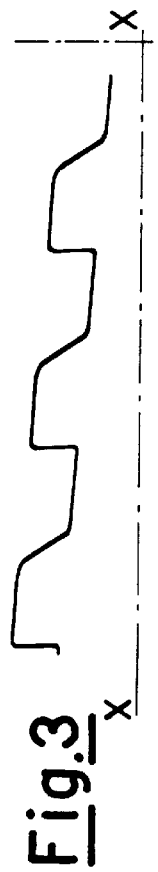

FIG. 3 represents a partial view, along the X—X axis, of the thread profile from which it can be seen that the preferred design includes both a negative loading angle and a positive inlet angle.

With reference to the figures, (1) indicates the hollow terminal part of a box pipe (3) equipped with an internal thread (2), while (4) indicates the corresponding hollow terminal part of a pin pipe (5) equipped with an external thread (6).

The pin and box elements of the pipe have a tapered-conical longitudinal section in which the conic zone varies from 8 to 16% depending on the diameter and thickness of the pipe.

Figure 4A:
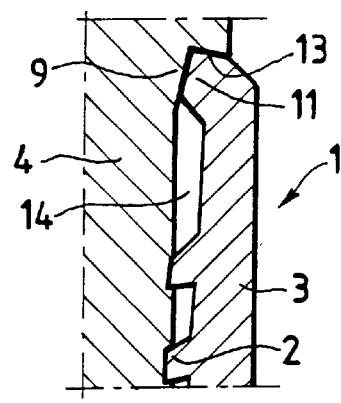
Figure 4B:
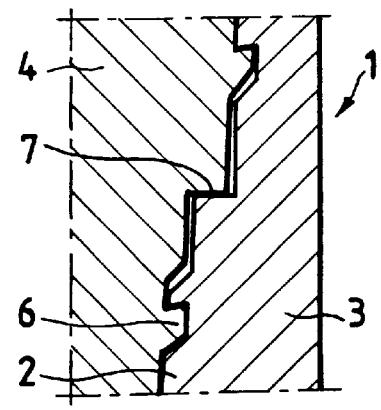
Figure 7B:
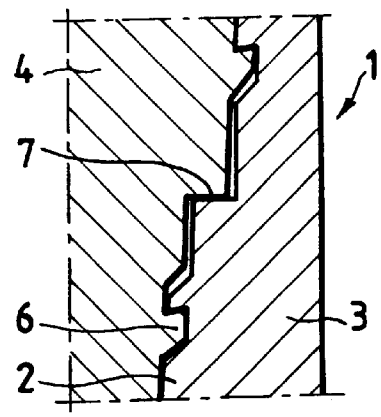

In corresponding with the half of the two threads (2) and (6), there is a shoulder (7), which is orthogonal to the axis of the pipes, as detailed in FIGS. 4B and 7B. The ends of the present integral joint are shown in FIGS. 4A/7A and 4C/7C respectively.

Figure 4C:
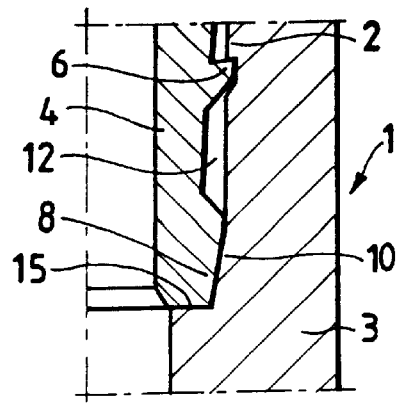
Figure 5:
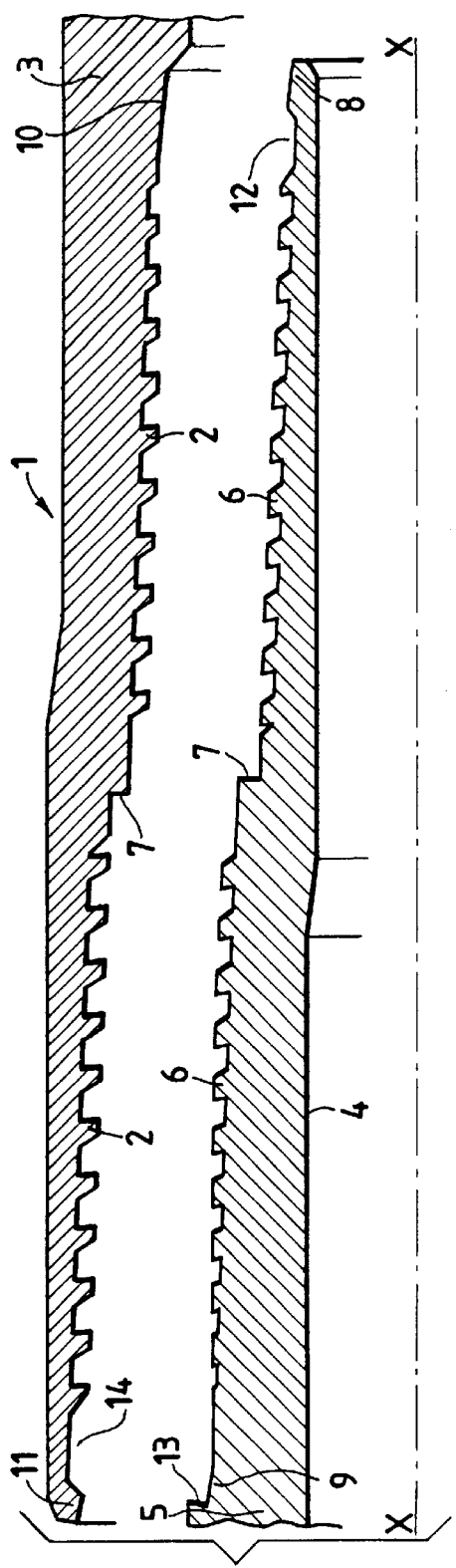
FIGS. 5 and 6 represent a longitudinal half-section of the pin and box elements of the joint shaped with two shoulders, along the X—X axis, in the non-coupled/coupled position.
Figure 6:
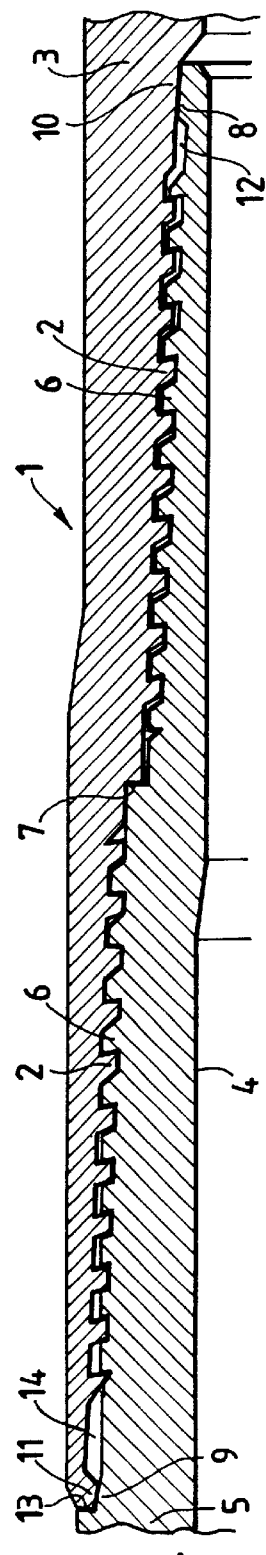
Figure 7C:
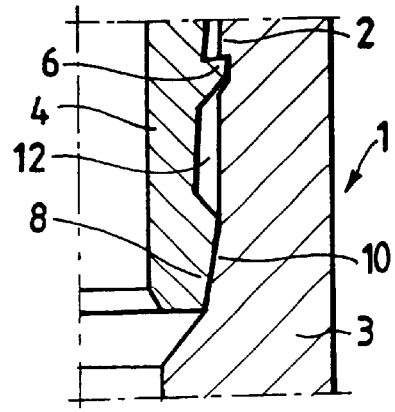

The pin element of the joint object of the present invention is shaped at the end with the external flares (8) and (9) which, by interfering with the internal insets (10) and (11) machined at the end of the box element, form two metal-to-metal seals, internal and external, which guarantee the complete sealing of the joint under any operating condition. Between the initial flare (8) of the pin element and the beginning of the thread (6), there is a slot (12) whose thickness is recovered at the end of the thread by the shoulder (13) orthogonal to the flare (9) . Between the initial inset (11) of the box element and the beginning of the thread (2), there is a slot (14) whose thickness is recovered at the end of the thread by the shoulder (15) substantially orthogonal to the inset (10) (see FIG. 4C). In the alternative solution this shoulder is not present (see FIG. 7C) but is absorbed by the inset (10).

Figure 1:
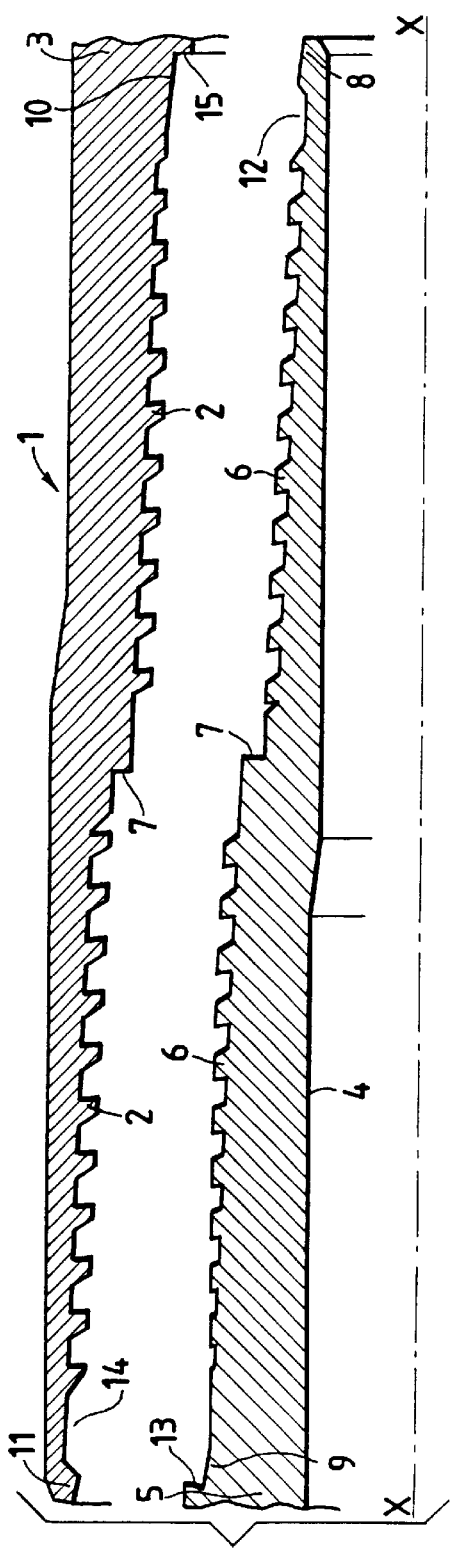
FIGS. 1 and 2 represent a longitudinal half section of the pin and box elements of the joint shaped with three shoulders, along the X—X axis, in the non-coupled/coupled position.
Figure 2:
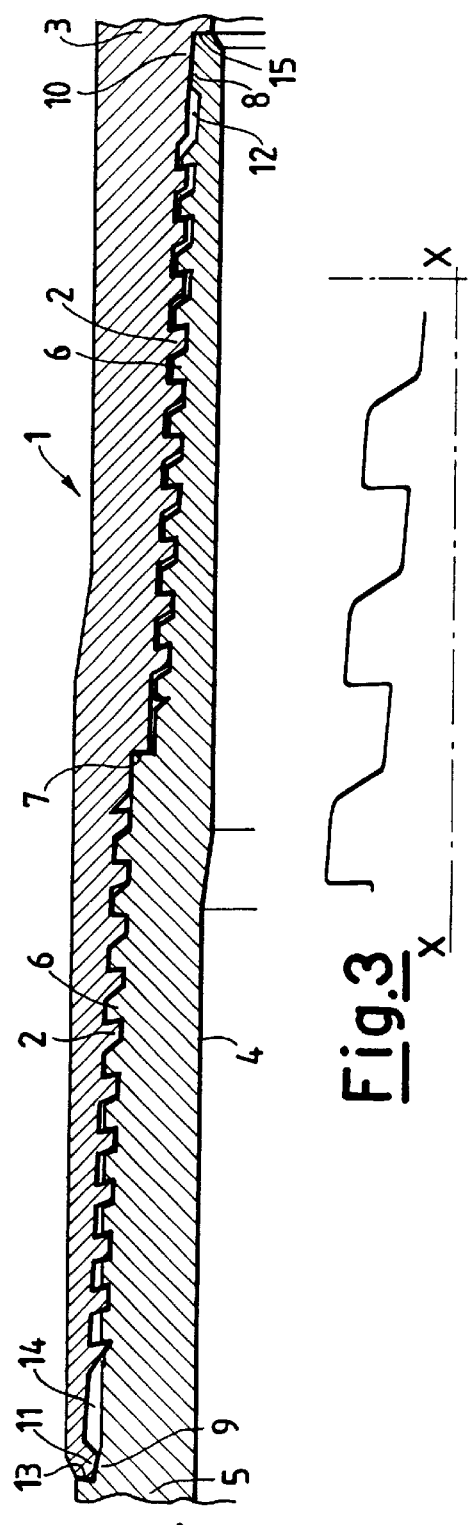

For purely illustrative purposes, the mechanical characteristics of the joint according to the present invention, as previously described in FIGS. 1, 2 and FIG. 4, are provided hereunder, relating to pipes of 195.58 mm in diameter and 15.11 mm in thickness. The hight of the shoulders are about 2 mm, for the internal and external shoulders, and about 1.5 mm for the intermediate shoulder.

The sum of the areas of the three shoulders is about 3500 $mm^2$ with a cross-sectional area of the pipe body of about 8600 $mm^2$ and a cross-sectional area of the joint of 6900 $mm^2$. This gives a resulting joint tensile efficiency equal to about 80% of the pipe body yield strength (tensile efficiency %=6900/8600×100=80%).

Considering the area of the three shoulders, the compression efficiency is 50% of the tensile efficiency (compression efficiency %=3500/6900×100=50%). Also taking into account the contribution of the thread (which can be estimated at about 30%) the compression efficiency can be said to be equal to the tensile efficiency of the joint (about 80%).

What is claimed is:

1. An integral joint for the connection of two pipes, comprising:

a) a box element having a tapered-conical longitudinal section within which an internal two-step thread is machined at an end of a first pipe;

b) a pin element having a tapered-conical longitudinal section within which an external two-step thread is machined at an end of a second pipe, said pin element suitable for making-up inside the box elements and thereby forming a connection;

c) a first shoulder, orthogonal to the axis of the first pipe, positioned on the pin element, half-way along the thread;

d) a second shoulder, orthogonal to the axis of the second pipe, positioned half-way along the thread of the box element and capable of mating with the first shoulder of the pin element when the connection is made-up;

e) a first inset machined at the beginning of the box element and a second inset machined at the end of the box element;

f) a first flare machined at the beginning of the pin element and a second flare machined at the end of the pin element, said first flare and said second inset interfacing, said second flare and said first inset interfacing;

g) a first annular slot dispersed between the first flare and beginning of the thread of the pin element there is an annular slot, a depth of said first annular slot is recovered with a pin shoulder having a thickness substantially equal to the depth of said slot, disposed at the end of the thread; and h) a second annular slot disposed between an initial inset of the pin element and a beginning of the internal thread, a depth of said second annular slot is recovered by one of a corresponding shoulder and the inset at the end of the internal thread.

2. An integral joint device, comprising:

a box disposed within an end of a first pipe, said box having an internal thread formed in a tapered-conical longitudinal section, a pin disposed within an end of a second pipe, said pin having an external thread formed in a tapered-conical longitudinal section, wherein the longitudinal section of said pin is capable of connecting with the longitudinal section of said box;

a first shoulder disposed on an end of said pin and orthogonal to an axis of said second pipe;

a first inset and a second inset disposed internally along said box;

a first flare disposed at a beginning of said pin thread and a second flare disposed externally along an end of said pin thread, wherein said first flare and said second inset interfere thereby forming a first seal, wherein said second flare and said first inset interfere thereby forming a second seal;

a first annular slot disposed between the first flare and a beginning of the pin thread, said first annular slot having a slot depth which is compensated by a depth of said first shoulder, said depth is substantially equivalent to the slot depth; and a second annular slot disposed between said first inset and a beginning of the box thread, said second annular slot having a slot depth which is compensated by one of a depth of a second shoulder or a depth of said second inset, said second shoulder disposed internally along an end of said box and orthogonal to an axis of said first pipe, each depth of said second shoulder and said inset is substantially equivalent to the slot depth.

* * * * *